United States Patent [19]

Brandeau

[11] Patent Number: 4,945,627

[45] Date of Patent: Aug. 7, 1990

[54] FLAT CABLE-CONNECTOR HAVING IMPROVED CONTACT SYSTEM

[75] Inventor: Edward P. Brandeau, 505 Sturbridge Ct., Flemington, N.J. 08822

[73] Assignee: Edward P. Brandeau, Flemington, N.J.

[21] Appl. No.: 346,555

[22] Filed: May 2, 1989

Related U.S. Application Data

[60] Division of Ser. No. 65,684, Jun. 16, 1987, Pat. No. 4,829,668, which is a continuation of Ser. No. 633,897, Jul. 24, 1984, abandoned.

[51] Int. Cl.[5] .............................................. B23Q 41/00

[52] U.S. Cl. .................................... 29/564.4; 29/33 M

[58] Field of Search .................... 29/564.2, 564.4, 749, 29/747, 755, 33 M

[56] References Cited

U.S. PATENT DOCUMENTS 4,253,234 3/1981 Niles et al. ........................... 29/882

4,272,879 6/1981 Wigby et al. ...................... 29/566.2

4,411,062 10/1983 Folk et al. ............................ 29/749

4,765,044 8/1988 Wilson et al. ................. 29/564.4 X

*Primary Examiner*—Eugene F. Desmond

*Attorney, Agent, or Firm*—Kenyon & Kenyon

[57] ABSTRACT

An electronic connector assembly in which multiple fine gage, closely spaced ground and signal wires of a matched impedance flat cable are gang terminated on centers by an improved crimp design and method. Each of the many wires in the cable is mechanically crimped by an applicator tooling into a contact which is narrow and thin enough to enable all of the wires to be terminated on the same close centers they have in the cable. The wire contacts can be made with great precision from uniform flat metal stock having the necessary narrowness, thinness, hardness and strength to serve also as high performance output spring terminals for the connector. The metal stock does not have to be as thick as the diameter of the wires to be terminated.

6 Claims, 8 Drawing Sheets

FLAT CABLE-CONNECTOR HAVING IMPROVED CONTACT SYSTEM

This application is a division of, application ser. no. 065,684, filed Jun. 16, 1987, now U.S. Pat. No. 4,829,668, which is a continuation of application ser. no. 633,897, filed Jul. 24, 1984, now abandoned.

BACKGROUND OF THE INVENTION

This invention relates to connector-cable assemblies such as used to make multiple interconnections between high speed circuits in computers, and similar electronic equipments.

Many present day electronic circuits (semi-conductors, large scale integrated circuits, etc.) have much higher densities, and faster switching speeds, than circuits of only five years ago. These modern circuits produce signal pulses with nanosecond, or even sub-nanosecond rise times, and relatively low power. Where it is necessary to transmit with high integrity the signals from one circuit to another that is physically removed by some distance (e.g. five feet), present day practice frequently is to use a flat cable with multiple signal lines. Each line of the cable has an impedance that is closely matched to the impedance of the circuits it is interconnecting. This impedance matching is necessary to prevent undue amounts of distortion, of attenuation, and of cross-talk of low power electronic signals traveling along the lines in the cable. Cables with impedance in the range from 50 to 95 ohms, and with from eight to forty signal lines are commonly used.

For reasons of mechanical, thermal and electronic performance, and also because of efficient size and installed cost advantage, a widely used type of matched impedance cable comprises a thin, flat ribbon of tough, low loss insulation, such as Teflon (Du Pont trademark). Buried in the insulation, are many fine gage, closely spaced wires which serve as multiple transmission lines. The wires are usually arranged in triplets in which a center signal wire is closely paralleled on each side by a ground wire. The impedance of each "triplet" transmission line is determined by the effective dielectric constant of the insulation surrounding them, by the gage of the wires, and by their distances apart.

By way of example, and as an aid in understanding the invention described hereinafer, one such flat cable which is typically used, comprises a thin ribbon of PTFE Teflon in which are buried sixty-six plated copper wires of 32 gage each. The wires are arranged in twenty-two "triplets" with a normal 50 mil (50 thousandths of an inch) center-to-center spacing from signal wire to signal wire. The cable insulation is about 30 mils thick and 1.13 inch wide. The impedance of each triplet line is nominally 95 ohms (plus or minus a few percentage points because of manufacturing tolerances). This impedance is measured with sub-nanosecond rise time pulses, which showed a propagation delay of slightly under 1.4 nanosecond per foor along ten feet of the cable.

In the inventor's previous pats. U.S. Pat. Nos. 4,173,388 and 4,288,917 there are described a contact device for, and a method of, mechanically terminating the fine gage wires of a flat cable. The cable shown in these prior patents comprised twenty-four fine wires uniformly spaced on 31.5 mil centers (1/32 of an inch), giving somewhat over 90 mils for the center-to-center spacing of the signal wires. The output sockets were in a single row and spaced on 125 mil (⅛ inch) centers. The left-most and right-most sockets (sockets no. 1 and no. 10 in FIG. 6 of U.S. Pat. No. 4, 173,388) were the only ones connected to "ground"; the center eight sockets (nos. 2-9) were connected to "signals". The wire contacts were designed with a wide open end or "throat" (for reasons explained in the patent). They were made thick enough so that where a wire was crimped in the "neck " of a contact, the bottom of the wire did not protrude beneath the bottom of the contact. The contacts for the signal wires could be made relatively wide because of the relatively wide spacing of the signal wires (about 90 mils).

Very high reliability of the wire terminations made according to these prior patents was obtained. But various additional design considerations led to manufacturing and assembly complexities in changing to a different cable-connector combination in which there were many more wires, or wires on much closer centers, or with a different "ground" and "signal" pattern for the output sockets.

A less than optimum solution to some of these problems is shown in the inventor's U.S. pat. No. 4,225,208. Here the signal wires and the ground wires were spaced about half as far apart (here, nominally about 17 mils center-to-center). Partly because of this closer spacing, partly because of the need to mix the sequence of output ground and signal sockets and to provide two rows of them, and partly for other reasons, it was necessary to "spread" or manipulate certain of the ground and signal wires from the spacings they originally had in the cable. This is clearly shown in FIG. 4 of the patent. Such an arrangement was complex and expensive, and involved a considerable amount of "hand" labor.

The present invention is intended to obviate many of these prior difficulties, and to give a connector-contact system having greater reliability and substantially lower cost. The present invention is highly useful in, but not limited to, the connector system shown in the inventor's copending application filed on even date herewith, titled IMPROVED FLAT CABLE-CONNECTOR ASSEMBLY.

It is an object of this invention to provide an improved contact device and method for mechanically terminating fine gage, closely spaced wires.

It is a further object to provide an electronic flat cable connector having improved performance, reliability and manufacturability.

Still another object of the invention is to provide simple, inexpensive and highly reliable applicator tooling and a method for connecting the cable wires to the connector.

These and other objects of the invention will be understood from the following description given in connection with the accompanying drawing in which.

Figure 7:
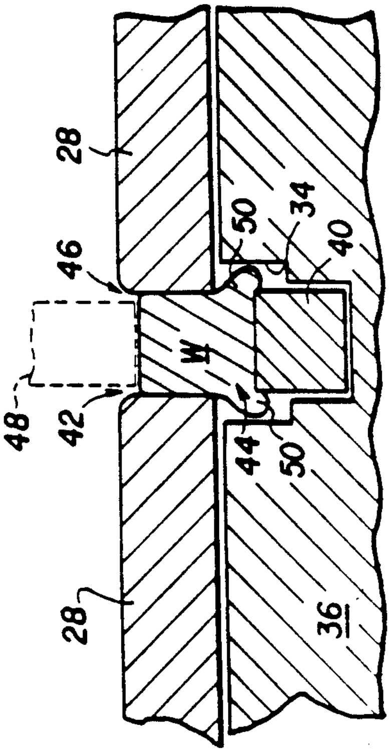
FIG. 7 is a transverse cross-section of the device taken as indicated by lines 7—7 in FIG. 6.
Figure 8A:
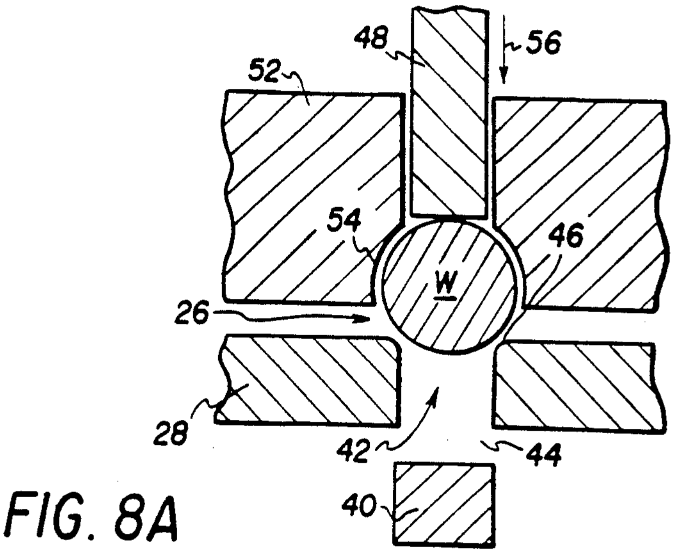
Figure 8B:
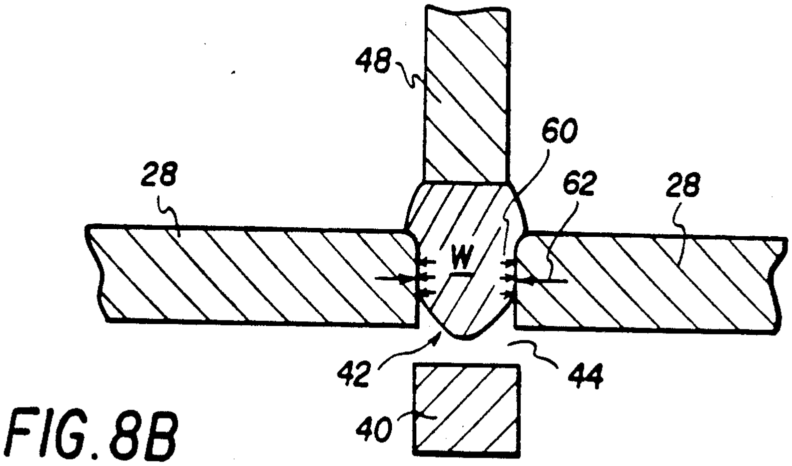
Figure 8C:
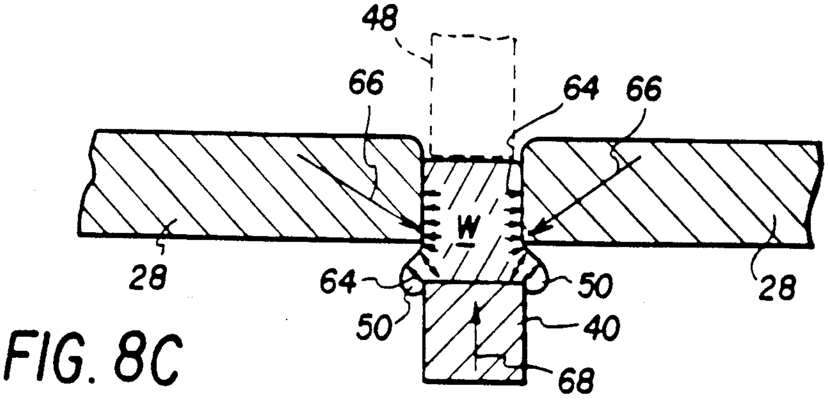
Figure 9:
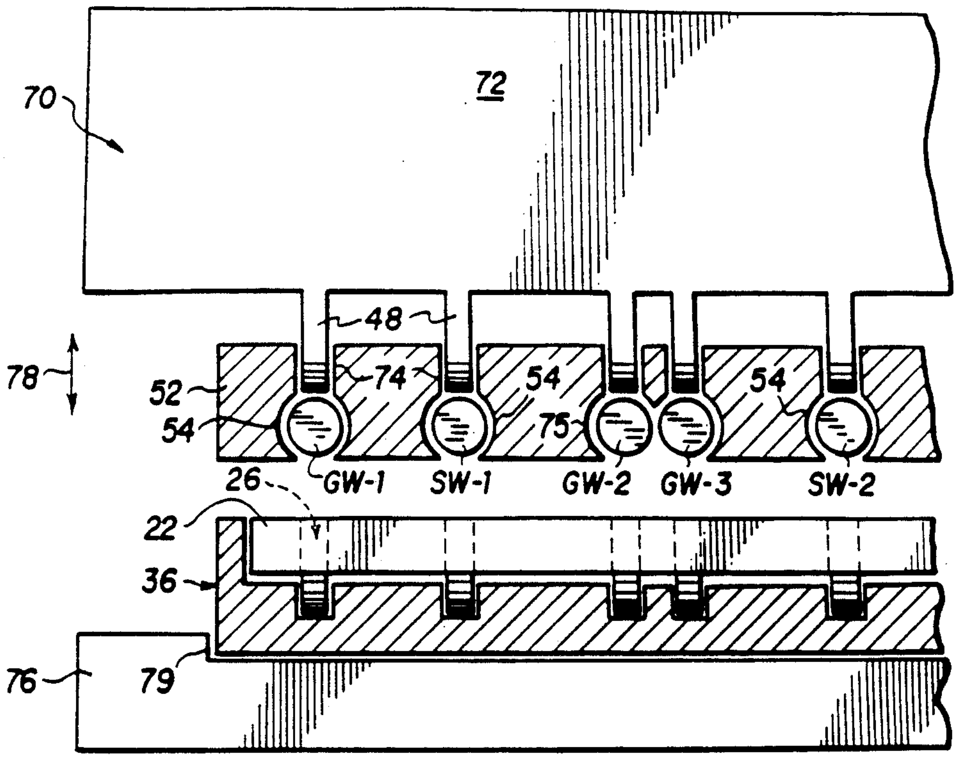
Figure 10:
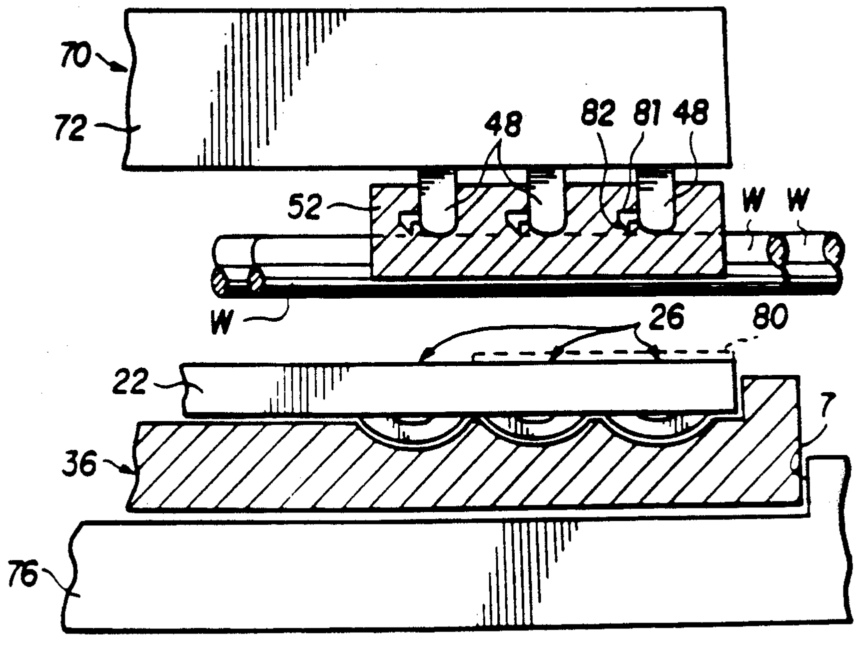

FIGS. 8A, 8B, and 8C are similar to FIG. 7 but show the sequence of terminatiion of a wire in the device;

FIG. 9 shows in schematic form a portion seen from the front of an applicator tool with its stuffer blades and wire comb, the wires being perpendicular to the plane of the paper; and FIG. 10 is a side view of the tool, the wires being parallel to the plane of the paper.

Figure 1:
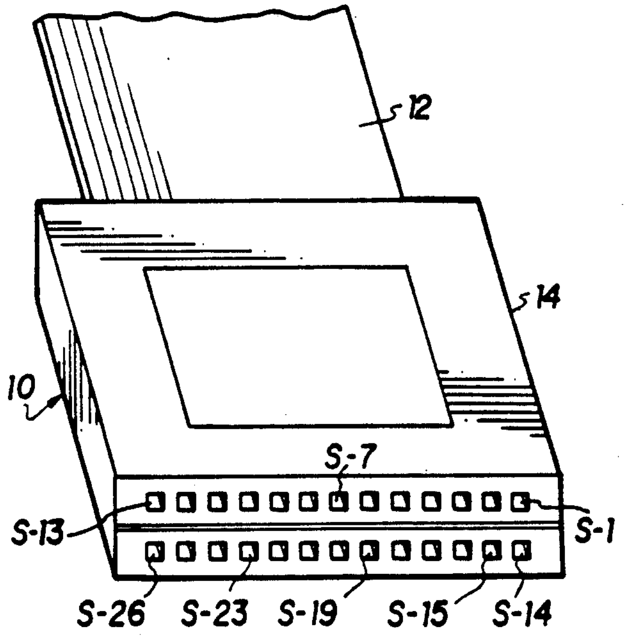
FIG. 1 is a perspective view of one end of a flat cable-connector assembly.

Referring now to the drawings, FIG. 1 shows a connector 10 in which are electrically terminated the many fine wires of a matched impedance flat cable 12. The connector comprises a thin, flat housing 14 of suitable insulating material (typically plastic) in which are contained and supported the conductive elements of the connector, the housing being tightly sealed or clamped onto the end of cable 12. It should be understood that the other end of the cable may be terminated in a similar connector (not shown).

The output of the connector comprises two rows of sockets, S-1 through S-13 in the upper row, and sockets S-14 through S-26 in the lower row. These sockets are intended to be plugged, onto, or unplugged from, input or output contacts (I-O contacts) of an electronic circuit. Typically such contacts are standard 25 mil square posts on suitable column and row spacings. Here it is assumed they are on tenth inch by tenth inch centers. Because of the need to repeatedly plug and unplug the connector in the course of its lifetime, and because high contact integrity is required, designing and manufacturing such a socket is no simple matter. One of the best socket designs presently available is that shown in U.S. Pat. No. 3,370,265 to Berg. A similar socket is shown in U.S. Pat. No. 4,342,498 to Patton and Muehling. The present invention lends itself eminently to the requirements of such a socket.

Figure 2:
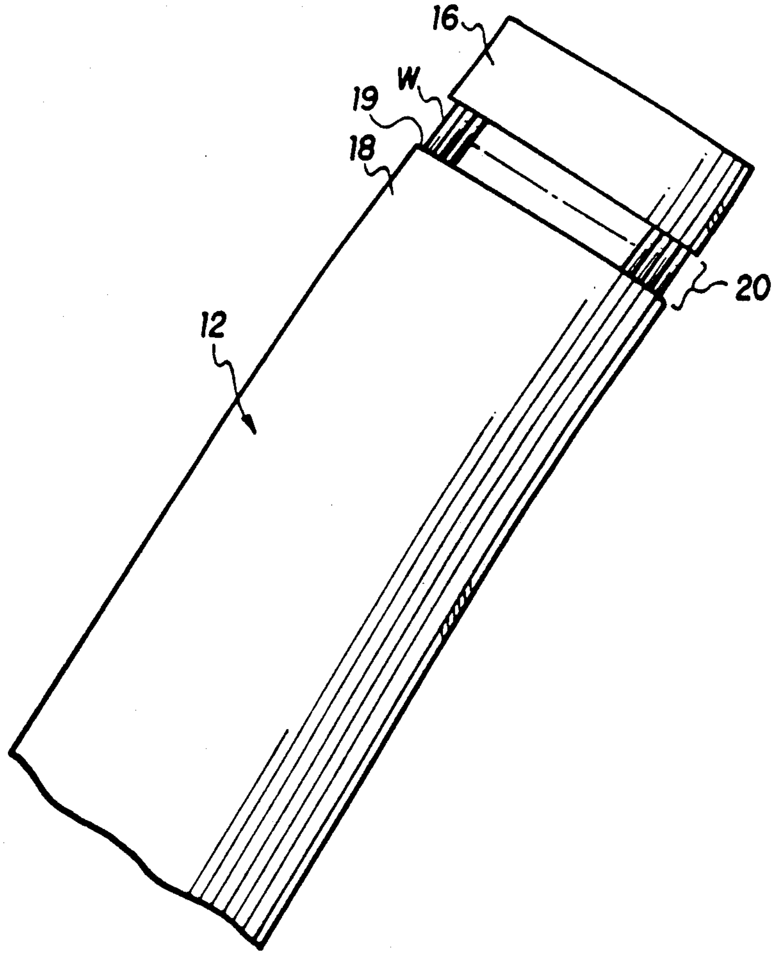
FIG. 2 is a perspective view of one end of the cable, prior to termination in the connector, showing a tab of cable insulation pulled partly off at end to expose a short length of the wires.

FIG. 2 shows a dressed end of cable 12 in which a tab 16 of insulation is cut from the cable insulation 18 at edge 19, and partly pulled off the ends of the cable wires W, thereby baring the wires for a short length in zone 20. The wires are straight and parallel in zone 20 and are held on their original centers by the cable insulation 18, and tab 16. The latter, along with the severed ends of wires W, will be discarded after the wires are terminated in the connector. Various makes of tools for dressing the ends of flat cables are commercially available. For a Teflon cable 1.13 inch wide, and having sixty-six 32 gage wires, a length for zone 20 of about 0.4 inch is adequate to permit the wires to be terminated in the contacts according to the present invention. After the end of the cable is dressed, such end is put in an applicator tool, which is described hereinafter. The tool has a wire comb which snugly fits over and partly around the cable wires holding them resiliently but firmly. Because of manufacturing tolerances, the right-most wire of the cable measured from the left-most wire, may actually be five to ten thousandths of an inch out of exact position. The tool comb corrects such minor variations and insures that all of the wires are on exact centers prior to terminating them. The wires terminating action of the tool is also described hereinafter.

Figure 3:
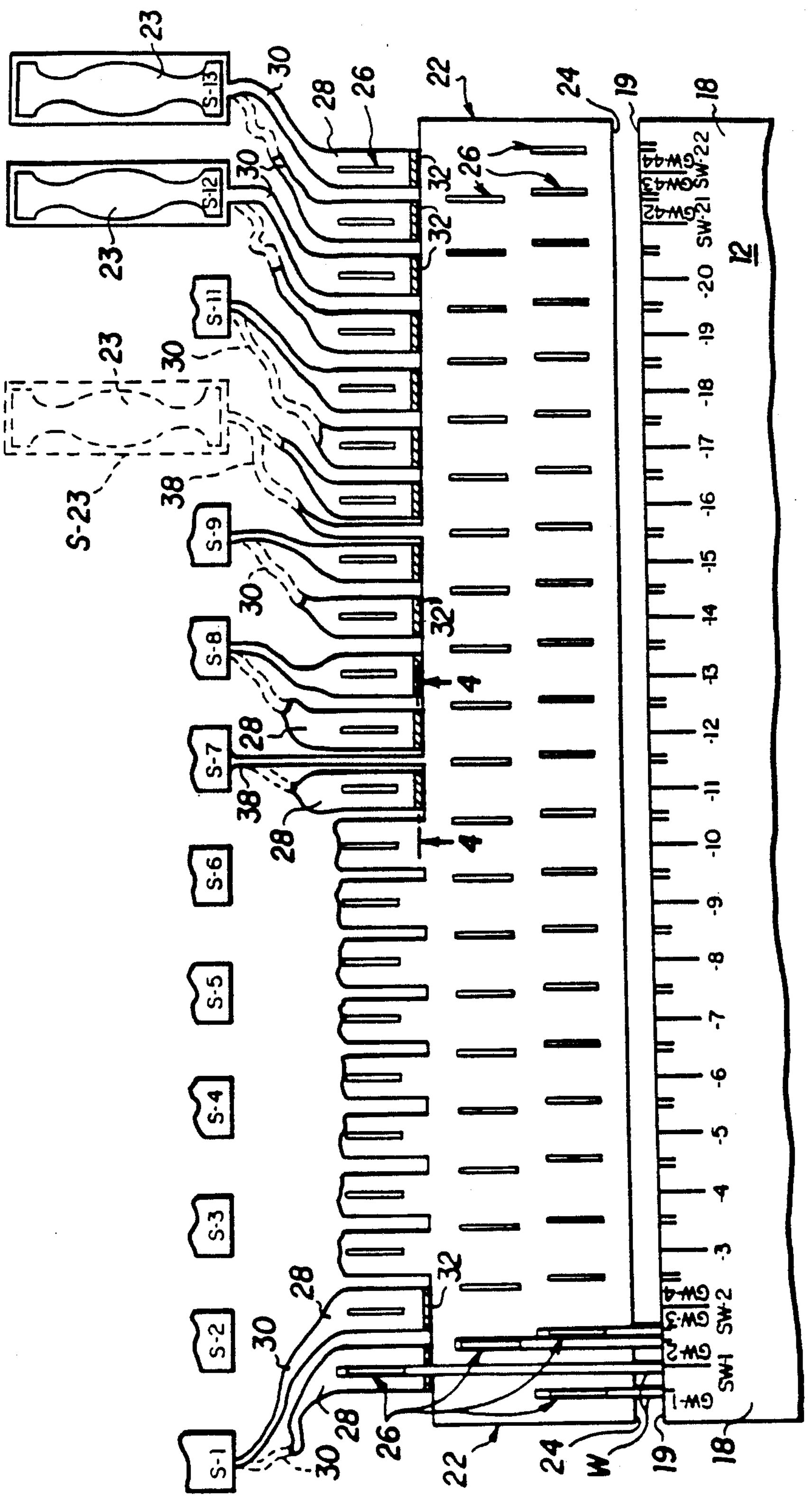
FIG. 3 is a plan view, approximately to ten times scale, showing somewhat schematically an array of wire contact devices in the connector according to this invention.

FIG. 3 shows in top plan view, approximately to ten times scale, an array 22 of wire contact devices and integral output spring contacts 23 which are within connector housing 14. For simplicity, none of the housing is shown in this figure. This drawing is somewhat schematic to better illustrate the invention and to aid in understanding its simplicity. Array 22 is formed from what was originally a rectangular flat piece of thin spring hard metal stock having a uniform thickness. The array is nested in housing 14 (not shown here but shown in other figures) which is molded to fit the under-side of the array. Portions of array 22 have not been completely drawn-in to illustrate that the original metal stock can easily be configured into the dimensions and profiles needed for any particular connector. It should be appreciated however, that array 22, up until the final stages of assembly of the connector may be handled as a unitary, single-piece assembly. This is a very important advantage in manufacturing.

As seen in FIG. 3, a tab end of cable 12 is positioned with its cut edge 19 closely adjacent and parallel to the long lower edge 24 of array 22. Wires W of the cable (which are exposed in zone 20) lie parallel to and slightly above the top plane of the array.

For simplicity in FIG. 3, only the four left-most wires of the cable are drawn-in. These comprise, at the extreme left, a ground wire with center line designated GW-1, then proceeding to the right a signal wire SW-1, a ground wire GW-2, and another ground wire, GW-3. The latter two are virtually touching. The first three wires GW-1, SW-1 and GW-2, comprise a single "triplet" transmission line in cable 12. The next triplet comprises the next three wires, GW-3, Sw-2 and GW-4. In the example shown here there are twenty-two signal wires (SW-1 to SW-22) and fourty-four ground wires (GW-1 to GW-44), a total of sixty-six wires. The wires are not all equally spaced, though the "signal" of each triplet is evenly spaced from the next "signal", and so on. The center lines of all the wires W are as indicated along and slightly below cable edge 19.

All of the sixty-six wires of the cable will terminate simultaneously to array 22 in respective contact devices generally indicated at 26 in FIG. 3. Each device 26 is positioned exactly under the corresponding wire to be terminated in it. These devices, 26, which will be described in detail shortly, are arranged in closely spaced rows and columns, there being sixty-six devices 26 corresponding to the sixty-six wires W in the cable illustrated. All of devices 26 can be formed in array 22 simultaneously, thus their true positions from left to right and bottom to top in the array are almost absolutely exact (within a thousandth of an inch).

As seen in FIG. 3, there are three left-to-right rows of devices 26 in array 22. The devices in the top row are where the signal wires (SW-1 to SW-22) are terminated. The devices in the bottom two rows are where the ground wires (GW-1 to GW-44) are terminated and electrically commoned. As seen best in the right and center of FIG. 3, each device 26 (in the top row) intended for signal wires is generally centered in a respective arm 28. The top of each arm continues as a narrowed tail 30 which extends upward in the figure along a bent, wavy path, of appropriate length and direction, to a respective one of output springs 23 in sockets S-1 to S-26. It should be noted here that sockets S-1 to s-13 are in the upper row (see FIG. 1) and that sockets S-14 to S-26 lie directly beneath them in the lower row. To avoid confusion in FIG. 3, only lower socket S-23 is shown and is indicated by dotted outline. Those tails 30 of signals arms 28 which connect respectively to the lower sockets are also shown in dotted lines.

Signal arms 28 and their tails 30 may be profiled, to the respective shapes and lengths desired, from the unitary thin metal sheet of array 22 with photographic accuracy using conventional "print and etch" techniques standard in electronic printed circuit board fabrication. The metal of array 22 is thin enough that it can efficiently be etched away selectively with line widths and spacings that are easily within the capability of p.c. board process technology. Array 22, with its signal and ground contacts and output springs 23 is advantageously staked or fastened in connector housing 14 as a unitary assembly. This maintained the precision in spacing of the contacts and reduces the cost assembly relative to prior designs. Thereafter, signal arms 28 of array 22 can be severed at their roots, as indicated by cross-hatched zones 32, from the remainder of array 22 in order to electrically isolate them. Details of this arrangement and the structure of output sockets S-1 to S-26 and springs 23 are further described and are claimed in the inventor's aforementioned co-pending patent application. It will be appreciated that to change from one sequence of ground and signal outputs, such as the one illustrated, to a different sequence is easily effected by merely changing a photographic negative.

Figure 4:
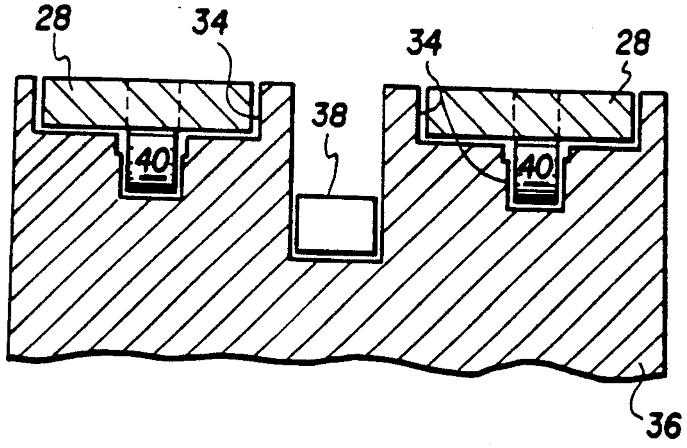
FIG. 4 is an enlarged cross-section, taken as indicated by lines 4—4 in FIG. 3 (near the middle), showing how "ground" and "signal" portions of the contact array lie in different planes.

FIG. 4 is an enlarged cross-section of a portion of array 22 taken along lines 4—4 as indicated near the center of FIG. 3. As seen in FIG. 4 two side-by-side signal arms 28 are nested in molded pockets 34 of a portion of base 36 of connector-housing 14. These arms lie generally on the same level as the plane of array 22 (seen as that portion of the array in the lower part of FIG. 3). Lying between arms 28 in FIG. 4 and somewhat below them, is a "ground" tail 38. By virtue of this vertical as well as horizontal separation the ground and signal elements are electrically well isolated. Also, because arms 28 lie above the ground tails 38, a single saw cut of limited depth can be used to severe arms 28 at zones 32 (FIG. 3) from the remainder of array 22 without cutting tails 38.

The particular ground tail in FIG. 4 connects to output socket S-7 seen in the upper center of FIG. 3. A ground tail 38, being relatively narrow, may be provided between any signal arms 28, and can connect to those output sockets which are to be "grounds". Another such ground tail 38 is shown in FIG. 3 connected to socket S-23 in the lower row. Each tail 38 is an integral part of the array 22 but is bent down and lies below its general plane. By virtue of this arrangement it is very easy to have almost any desired pattern or sequence of "ground" and "signal" output sockets. By way of example, in FIG. 1 sockets S-7, S-15, S-19, and S-23 can be "grounds" and the remaining twenty-two sockets, "signals". Those skilled in the art will appreciate the simplicity of this arrangement compared with the design shown in U.S. Pat. 4,225,208.

Figure 5:
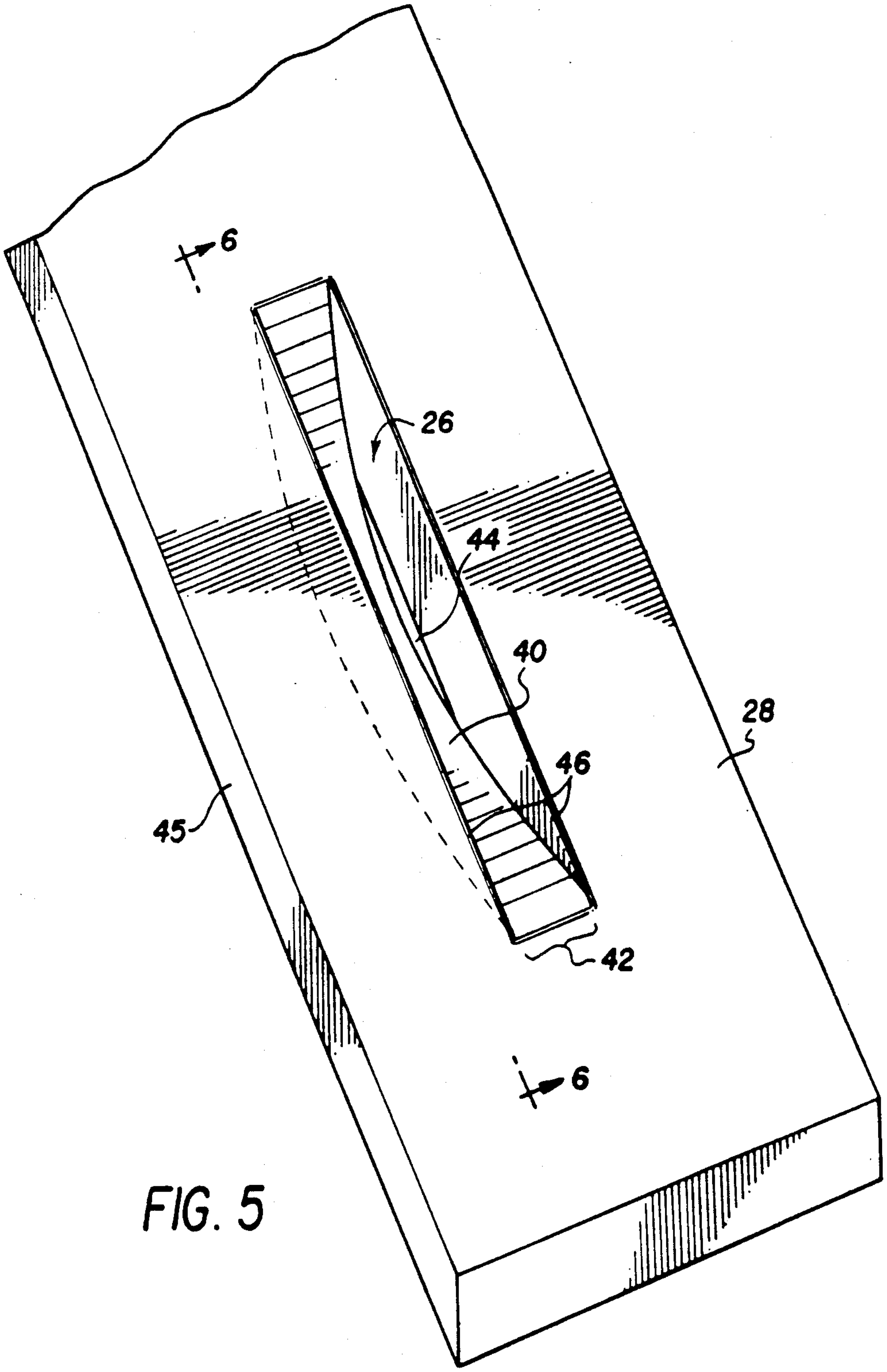
FIG. 5 is a perspective view, approximately to one hundred times scale, showing one of the contact devices prior to termination of a wire therein.

FIG. 5 herein shows greatly enlarged and substantially to scale, a signal arm 28. Centered near the lower end of the arm is wire terminating contact device 26 which is made by lancing or punching down a curved rib 40, leaving a long narrow slot 42. The slot is tapered in depth from its center to each end, where it smoothly disappears in the top surface of arm 28. The top surface of rib 40, at its lowest point of curvature is bent somewhat below the bottom surface of arm 28 leaving slight side openings or gaps 44 at the bottom of slot 42. By adjusting the area of these gaps 44, slot 42 may be made effectively deeper or shallower. It is easily optimized for terminating a particular gage of wire. Arm 28 is made from thin metal stock whose thickness is indicated at 45. The width of arm 28 is many times the width of slot 42, the width of the latter being smaller than the diameter of the wire to be terminated. The metal of arm 28 extends well beyond the ends and sides of the slot so that effectively, in so far as a wire being terminated is concerned arm 28 appears to be 37 infinitely" wide and long. The top edges of the slot, as indicated by the shaded lines 46 are intentionally rounded to a substantially degree. The width of slot 42 may be approximately equal to thickness 45; its effective depth is easily adjustable.

Figure 6:
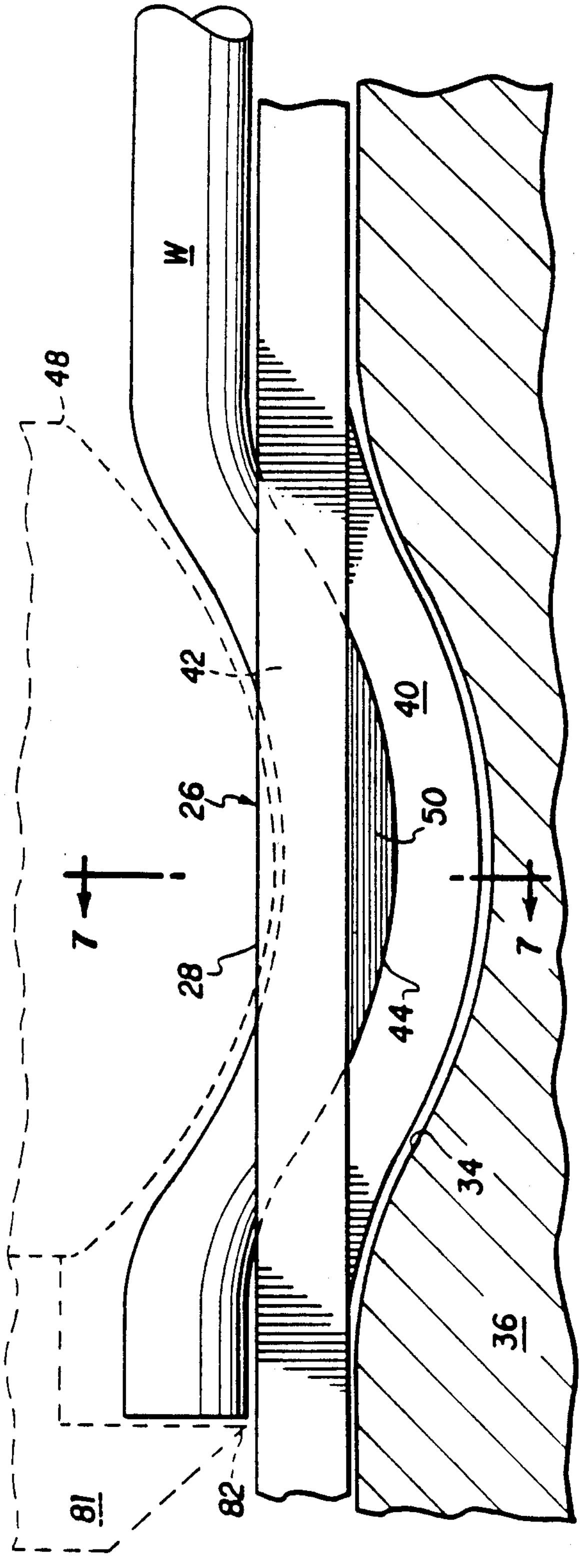
FIG. 6 is a lengthwise cross-section of the device taken as indicated by lines 6—6 in FIG. 5 and showing a fine gage wire terminated in the device.

FIG. 6, which is a longitudinal cross-section of arm 28 taken as shown in FIG. 5, shows a wire W terminated in contact 26. As shown here, but not in FIG. 5, arm 28 lies upon and is nested in pocket 34 of housing base 36 (see also FIG. 4), with rib 40 also being supported underneath along its curved length. Wire W is forced along its length into slot 42 of contact 26 by a curved tool blade 48, shown here in dotted outline. The radius of curvature of the bottom of blade 48 is somewhat less than the curvature of rib 40. Thus as the blade is forced downward upon wire W, the portion of the wire in the center, deepest part of slot 42 is deformed much more than where the wire enters the slot at its two ends. This insures that the terminated wire is neither guillotined nor weakened where it enters the slot. In effect, a short loop of wire has been pushed through what amounts to the "eye" of a needle, and the wire locked in the needle by permanently deforming that portion of the wire which protrudes through the eye.

At the center, deepest portion of slot 42, wire W is substantially mushroomed or coined against the rib top, and portions of the wire are extruded outward into slot side openings 44. The wire, being of copper, is substantially work-hardened in the process of deforming it. An extruded side portion or "ear" of the wire is indicated by the shaded area 50 in FIG. 6. Now, as seen also in FIG. 7, these extruded wire portions 50 are wedged between the top and edges of rib 40 and bottom edges of slot 42. Wire portions 50 act to force vertically apart rib 40 and those portions of arm 28 on either side of slot 42. This is akin to forcing the blades of a scissors apart against a stiff spring. In addition to this action, the sides of the wire are tightly wedged against the vertical sides of the slot. Thus when the force of the tool blade is removed, spring forces of the contact acting on wire W remain extremely high. The sides and extruded ears of the wire are scraped down to virgin metal when the wire is forced into slot 42. As a result of all this, a very low electrical resistance, clear gas-tight joint between wire and contact is obtained. The effect of long term stress relaxation of the metal parts here is negligible because arm 28 is made of very hard spring material, and wire W has been substantially work-hardened inside the contact. Because wire W has been wedged into slot openings 44, it cannot, without breaking, being pulled out of contact 26; the wire is mechanically locked in place.

FIGS. 8A, 8B and 8C (which are similar to FIG. 7) show, somewhat schematically, the sequence of terminating a wire in contact 26. A wire W, whose longitudinal center-line here is perpendicular to the paper, lies parallel to and in the same plane as the other wires (not shown) of cable 12. All the wires W, where exposed in zone 20 (see FIG. 2), are placed in an applicator tool described hereinafter. As seen in FIG. 8A, a wire W is held aligned precisely over and parallel to a respective contact slot 42. Each wire is resiliently but firmly held on exact centers by a tool comb 52 which has a recess, such as cavity 54, for each wire of the cable. As tool blade 48 moves down from the position shown here, in the direction of arrow 56, comb 52 remains stationary and wire W is pushed out of cavity 54 onto rounded slot edges 44. The wire substantially wider than slot 42 and so does not freely enter it. Arm 28, and rib 40 are supported against movement by the base of the connector housing (not shown) which in turn it supported underneath by the tool.

Tool blade 48 then continues to move down as shown in FIG. 8B. The wire is now partially deformed by the side walls of slot 42 and begins to protrude beneath arm 28 in the center deepest part of the slot (see also FIG. 6). The force required to push wire W down to the position shown in FIG. 8B is relatively low because the bottom of the wire has not yet encountered rib 40. Even so, the sides of the wire, and the sides of the slot are being scraped clean of surface contaminants. The relative forces acting between wire W and arms 28 at this point are shown by the small arrows 60 and 62 respectively. If the tool blade 48 were removed now the wire could easily be peeled up and out of slot 42. A secure mechanical joint has not yet been effected even though there may be good electrical contact.

However, as seen in FIG. 8C, tool blade 48 (shown here in dotted outline) is moved farther down so that the wire at the center, deepest part of the slot is substantially deformed or mushroomed against rib 40. This also extrudes sidewise the portions 50 of the wire, as previously explained. The top of wire W can lie below the top of arm 28 because tool blade 48 is narrow enough to enter slot 42. After the tool blade is removed, the forces acting between wire W, arm 28 and rib 40 are as indicated by arrows 64, 66 and 68 respectively. The vector directions and relative magnitude of these forces are approximately as indicated. The wire is now mechanically locked in place and very high spring forces remain acting on it. These hold the wire, for a considerable distance along its length and over an area many times its own cross-sectional area, in intimate contact with the slot walls of 28 and with rib 40. In this simply way an exceptionally tight and secure joint is obtained. The electrical contact resistance of this joint approaches a theoretically perfect value.

Advantageously, as shown in FIG. 8C, from a quarter to a half the cross-section area of the wire, at the deepest part of slot 42, lies below the bottom plane of arm 28. It should of course be understood that the wire is progressively less and less deformed as it extends to the ends of the slot, being substantially not deformed at all outside the slot (see FIG. 6).

It should also be understood that the contacts 26 intended for "grounds" are virtually identical in their action compared to the "signal" contact just described. The "ground " contacts are intended to be electrically commoned, therefore they are not separately profiled into electrically isolated members. But since the width of a signal arm 28 (see FIG. 5) is many times times the width of its slot 42, for all intents and purposes the arm appears to extend "infinitely" in so far as a wire crimped into its slot 42 is concerned. A wire therefore cannot tell the difference between being crimped in a ground contact or a signal contact. The net strength of those portions of any contact placed under load by a wire crimped in its slot because of the dimensions and geometry chosen relative to slot 42 and the high strength of the contact material, is many times that of the wire. The yield strength of the contact material may be up to ten times the yield strength of an annealed copper wire.

FIGS. 9 and 10 show somewhat schematically an applicator tool 70 according to the invention. As shown here, the individual tool blades 48, there being a respective blade for each wire to be terminated, are firmly mounted on a platten 72. Each blade closely fits into one of the rectangular slots 74 of a tool comb 52 (see also FIG. 8A). This comb along its underside has a number of semi-cylindrical pockets 54 into which corresponding wires of the cable can be nested. As shown in FIG. 9, the left-most comb pocket 54 holds the left-most wire of the cable, ground wire GW-1, the next comb pocket 54 holds signal wire SW-1, while the next pocket, indicated at 75, is "dumb-bell" shaped and holds two ground wires GW-2 and GW-3. The nearly touching relation of these two wires corresponds to their original spacing in cable 12 (see also FIG. 3). Comb 52 is made of a slightly resilient material, advantageously molded rubber of suitably hard durometer, and holds the cable wires firmly on exact centers, yet permits the wires to be easily forced out of pockets 54 and 75 by blade 48.

Tool platten 72 is mounted on vertical guides (not shown) which extend from a stationary tool base 76. Platten 72 may be moved up and down in the direction of double arrow 78 relative to base 76 by a mechanical linkage (not shown). After the cable wires are positioned and held in comb 52 the base 36 of a connector, including its contact array 22, is placed in a shallow recess 79 in tool base 76. This positions all of contacts 26, which lie in the same horizontal plane, precisely underneath and in exact column and row alignment with the wires to be terminated. A short downward stroke of tool platten 72 then causes all of the wires to be terminated in their contacts 26 by tool blades 48 (see also FIGS. 8A, 8B and 8C). Tool blades 48 are substantially identical to each other, as are contacts 26. Thus each wire termination will look like all of the others.

As seen in a side view of the tool in FIG. 10, tool blades 48 are mounted on platten 72 in three rows, corresponding to the three rows of contacts 26 shown in FIG. 3. Wires W are held in comb 52 parallel to and slightly above connector array 22. If desired, prior to terminating the wires, a thin layer of insulation, indicated at 80 by dotted lines, may be selectively applied on top of that portion of array 22 which comprises "ground". This will additionally isolate the signal wires from ground. Each tool blade 48 shown in FIG. 10 has a spur-like cutter 81 which extends back and down from the blade. The cantilever mounting of cutter 81 permits it to spring up slightly relative to blade 48 when a wire W is terminated. Each cutter 81 (see also FIG. 6) has a sharp knife edge 82 which when a wire W is terminated, cuts off the end of the wire against the top surface of a contact. Thereafter all of the cut wire ends, which remain held in cable insulation tab 16 are discarded.

In a model of the connector according to the present invention, which has been built and tested, contract array 22 was made of a thin rectangular piece of hard, heat treatable beryllium-copper (Cabot Brylco #25) which was 6 mils thick, and about 1.2 inches by 1 inch. Each contact 26 had a slot 42 which was 6 mils wide and about 50 mils long. Side slot openings 44 were about 2 to 3 mils high. A signal arm 28 was about 35 mils wide. The slot sides and surfaces of each contact 26 were plated with tin-lead solder about 200 micro-inches thick. A 32 gage, annealed copper wire (8 mils diameter) terminated in the contact had an initial contact resistance of less than 200 micro-ohms.

It will be appreciated by those skilled in the art that the connector and contacts provided according to this invention represent a substantial improvement in reliability, in manufacturability, and in ease of assembly over connectors known previously. Various minor changes in the materials, dimensions and geometry of the embodiment of the invention illustrated may be made without departing from the spirit of scope of the invention as set forth.

I claim:

1. A tool connector system for gang terminating a plurality of fine gage, closely spaced wires in a matched impedance flat cable, said system comprising a connector having a housing, a substantially planar array of slot-like contacts mounted in said housing, each contact being on precise centers which correspond to the centers of the wires to be terminated, a tool frame having pockets means for precisely aligning each wire above the slots of the contact array, and blade means movably mounted on said tool frame for forcing each wire into a contact slot, said blade means comprising thin rounded ends which coin each wire into a contact slot.

2. The tool connector system of claim 1 wherein each blade includes a spring-mounted cutter blade which cuts each wire as it is terminated.

3. In a cable-connector system of the character described, applicator tooling for terminating into a connector with wire contact slots simultaneously and with great precision all of the fine, closely spaced wires of a matched impedance flat cable, said tooling comprising combination means for holding on exact centers the wires of the cable along a short horizontal length, said combination means having a plurality of pockets or recesses spaced parallel to each other on said centers in a desired pattern and in which said cable wires can be snugly fitted, each said recess having an opening through which a tool blade can enter vertically and force a wire in the recess into a respective connector contact slot lying closely parallel and adjacent to said recess on said exact centers, a tool platen, a pluralilty of stuffer tool blades mounted in fixed relation in a generally planar configuration on said platen in a pattern exactly matching the pattern of said combination pockets and the connector contact slots, a tool base for supporting a connector and its contacts in indexed relation to said combination means and said tool blades, and means to move said platen and tool blades a measured distance vertically through said combination recesses, whereby all of the wires of the cable can be gang terminated precisely into the connector contacts.

4. The combination of elements as in claim 3 wherein each of said stuffer tool blades is slightly narrower than the contact slot into which the respective cable wire is to be stuffed, the end of each blade being curved so that all of the wires of the cable are mechanically terminated without substantially weakening them.

5. The combination of elements in claim 4 wherein each stuffer blade has a sharp cutter edge at its rear whereby when the wires of the cable are terminated, excess cable wire is trimmed off.

6. The combination of elements as in claim 4 wherein said combination means is molded of a suitable hard polymer.

* * * * *